Nov. 30, 1948.  H. L. MUELLER  2,455,312
KICK STAND

Filed June 20, 1946  2 Sheets-Sheet 1

INVENTOR.
HOMER L. MUELLER
BY
Oberlin & Limbach
ATTORNEYS

Nov. 30, 1948. H. L. MUELLER 2,455,312
KICK STAND
Filed June 20, 1946 2 Sheets-Sheet 2
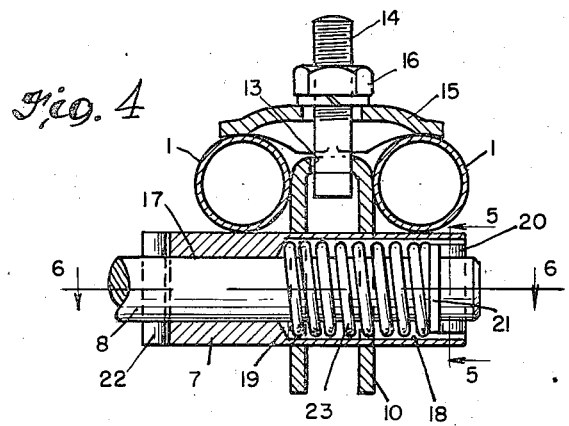
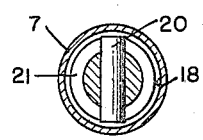
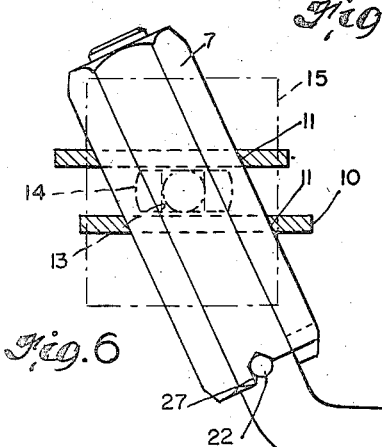
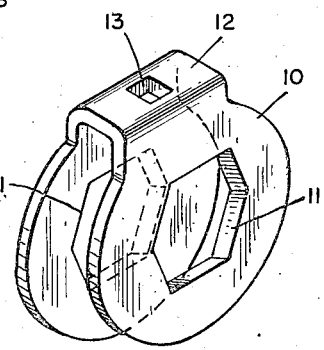
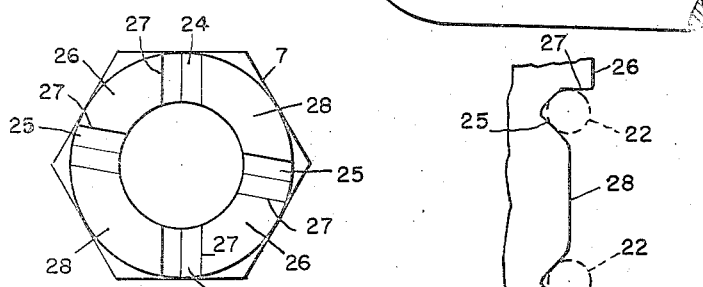
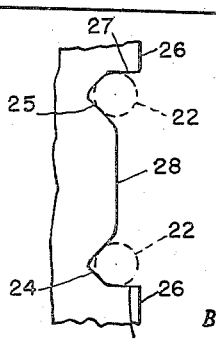
INVENTOR.
HOMER L. MUELLER
BY Oberlin & Limbach
ATTORNEYS Patented Nov. 30, 1948

2,455,312

UNITED STATES PATENT OFFICE 2,455,312

KICK STAND

Homer L. Mueller, Cleveland, Ohio, assignor to The Cleveland Welding Company, Cleveland, Ohio, a corporation of Ohio Application June 20, 1946, Serial No. 678,042

4 Claims. (Cl. 280—301)

The present invention relates to improvements in a kick stand for stably supporting a bicycle or other unstable vehicle. Kick stands in general are, of course, well known in the art and included in a majority of them is a prop which is rotatable from an inoperative out-of-the-way position to an operative vehicle supporting position, means being employed for yieldably retaining the prop in either of such positions.

It is one principal object of this invention to provide novel means for immovably mounting a kick stand on a bicycle frame to obviate the possibility of the same being jarred or vibrated out of proper relation therewith.

It is another object of this invention to provide novel clamping means which, in addition to effecting firm clamping of the kick stand on a bicycle frame, makes provision for longitudinal adjustment of the kick stand housing so that the prop which is rotatable therein can be properly folded away to an inoperative position underneath the lower rear fork of the bicycle so as not to protrude laterally therefrom any more than necessary.

It is another object of this invention to provide a highly efficient spring actuated stop and detent mechanism for limiting the extent of opposite movements of the prop and for yieldably holding it in either its operative or inoperative position.

Additional objects and advantages will become apparent as the following description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In the drawings:

Fig. 4 is an enlarged cross section view taken longitudinally and centrally through the kick stand housing;

Fig. 5 is a transverse vertical cross section of the kick stand taken along line 5—5 of Fig. 4;

Fig. 6 is a central horizontal cross section view of the kick stand taken along line 6—6 of Fig. 4, the clamp and screw, which are disposed above such line being represented by dot-dash lines;

Fig. 7 is a perspective view of the kick stand mounting bracket;

Fig. 8 is an enlarged view of that end of the kick stand housing which includes the detent and stop recesses; and Fig. 9 is a developed view of the recess formation of Fig. 8 between two adjacent recesses which are engaged by one of the two projecting lugs on the prop.

Figure 1:
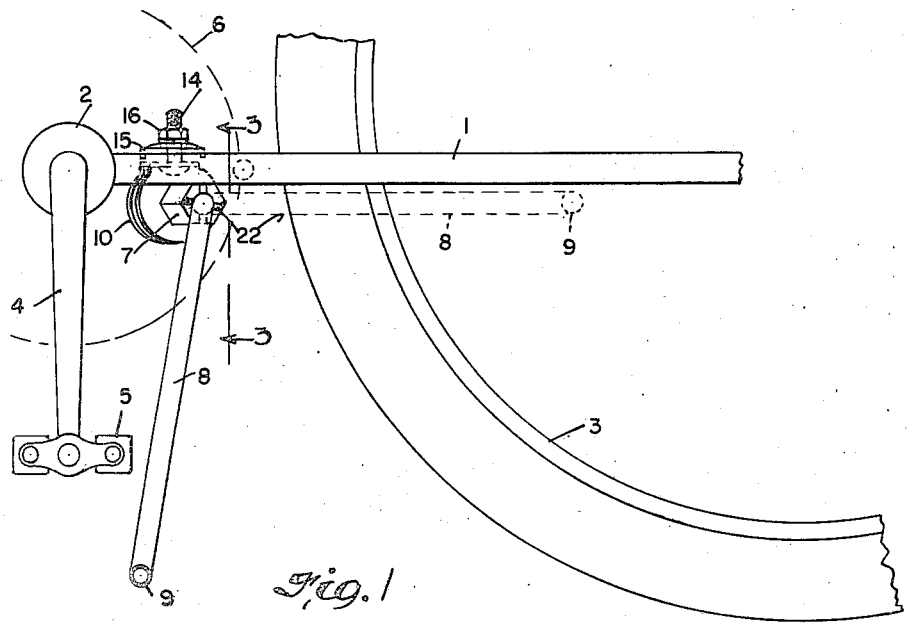
Fig. 1 is a side elevation view of the lower rear portion of a bicycle with the kick stand comprising the present invention shown in an operative position for supporting the bicycle upon slight tilting thereof from the vertical position shown.
Figure 2:
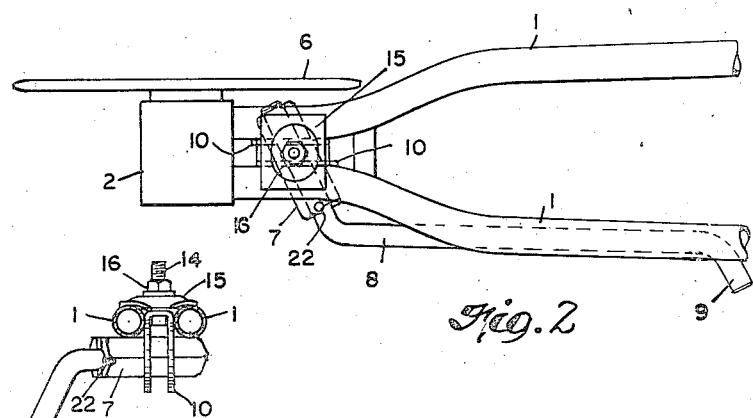
Fig. 2 is a top plan view of a portion of the lower rear fork of a bicycle showing the kick stand in an inoperative out-of-the-way position, that is folded to a position underneath the fork as shown in the dotted lines of Fig. 1.

Referring now to the drawing, there is shown in Figs. 1 and 2 a portion of the lower rear end of a typical bicycle which comprises two spaced apart frame members 1 forming the lower rear fork of the bicycle, said members 1 being disposed in a substantially horizontal position as shown with a crank bearing 2 joined thereto at one end and a rear axle for a wheel 3 being secured at the other end. The crank bearing 2 rotatably supports a crank which has thereon arms 4, foot pedals 5 and a sprocket wheel 6 and, as is well known, without further explanation, propelling of the bicycle is effected by rotation of the crank, the sprocket wheel of which is usually provided with a chain thereabout in driving engagement with a sprocket wheel secured to the hub of wheel 3.

The kick stand which constitutes the present invention comprises an elongated hollow housing 7 preferably of hexagonal or other non-cylindrical exterior cross section, which has journalled therein a prop 8. Housing 7 is firmly clamped to the bottom sides of members 1 and is of length sufficient not only to span the space between them but to permit some longitudinal shifting thereof relative to the members 1 for a purpose which will become apparent as this description proceeds.

Figure 3:
Fig. 3 is a transverse vertical cross section view of the kick stand in an operative position as taken along the line 3—3 of Fig. 1, the pedals, sprocket wheel, etc. being omitted for purposes of clarity.

Inasmuch as it is desirable that the prop, when in an inoperative or folded away position, will protrude a minimum amount laterally of the bicycle, and when in an operative or extended position will protrude a maximum amount laterally of the bicycle, the journalled upper end of prop 8 is bent through an angle less than 90° and the housing 7 is mounted on the bicycle frame with its axis in a horizontal position but inclined relative to a plane transverse of the plane of the bicycle frame. In this way, prop 8 will neatly fold away under the rear fork as shown in Fig. 2 and will project laterally a sufficient amount to stably support the bicycle when swung to the position shown in Fig. 3. From Fig. 2 it can be seen that by making provision for adjusting the housing 7 lengthwise, it can be set as desired so that the foot end 9 of prop 8 projects laterally of the bicycle frame a minimum amount.

In order to immovably lock the kick stand to the bicycle, I have devised a novel form of bracket 10, by means of which the housing 7 is firmly held from rotating about its longitudinal axis and from rotating in a horizontal plane to respectively preclude disturbing of the limits of movement of the prop 8 relative to the bicycle, that is between the solid and dotted line positions of Fig. 1, and to assure that the prop 8 will be disposed generally parallel to members 1 when in the position shown in Fig. 2. Bracket 10 is preferably made from flat sheet stock bent to U-shape to provide spaced parallel leg portions through each of which is an opening 11 of cross section complementary to that of the exterior of housing 7. Openings 11 are coaxially arranged and the axis thereof is inclined relative to the faces of the leg portions, as clearly shown in Fig. 6. The spacing of the leg portions is such that the bracket will rather closely fit in the space between frame members 1. The upper section 12 of the bracket which connects the two leg portions has a non-circular opening 13 therethrough for non-rotatably engaging the non-cylindrical shank of a T head screw 14. It is to be noted that the opposed flat surfaces of the head of screw 14 also function to prevent rotation of the screw relative to the bracket. The threaded end of screw 14 projects upwardly through the space between frame members 1 and extends through an opening in a clamp plate 15, which plate transversely spans the top sides of members 1. Plate 15 is preferably shaped to partially conform to the cross section shape of members 1 so that it can be properly positioned transversely across members 1. The dished shape of plate 15 renders the same very rigid and stiff so that the nut 16, which is threaded onto screw 14, can be firmly drawn up without danger of causing buckling of the plate.

Now it can be seen that when nut 16 is firmly tightened after housing 7 has been adjusted longitudinally as desired, housing 7 cannot rotate about its longitudinal axis because the flat surfaces thereof are in firm engagement with the bottom sides of members 1. Likewise housing 7 cannot rotate in a horizontal plane because of the non-rotatable connection with bracket 10, the latter of which is non-rotatably fitted between frame members 1. Thus, the housing 7 is firmly fixed against all movement relative to the bicycle.

Having thus described the mechanism for securing the housing 7 to the bicycle frame, reference will now be made to the spring actuated stop and detent mechanism for limiting movement of prop 8 between the solid and dotted line positions of Fig. 1 and for yieldingly retaining the prop in either of such positions.

As clearly shown in Fig. 4, housing 7 is hollow and is formed with a bore 17 and a counter-bore 18 defining a shoulder or ledge 19 therebetween. The journalled end of prop 8 is telescoped into the housing and is rotatably supported by bore 17 which is of extent approximately one-half the length of the housing so as to provide a long bearing therefor. Prop 8 has two spaced enlarged portions thereon, one of which comprises a pin 20 and washer 21 and the other of which comprises a pin 22, both of said pins being of length greater than the diameter of the prop and being fitted into transverse holes drilled diametrically through prop 8. Pin 22 is preferably a drive fit with the hole in the proper, whereas pin 20 may or may not be a drive fit as desired, inasmuch as it is disposed within counter-bore 18 and the wall thereof would retain it in place even though it were loosely fitted in the hole in the prop. The transversely projecting ends of pin 22 are constantly urged into engagement with one end of housing 7 by means of a coil spring 23 in counter-bore 18 compressed between washer 21 and shoulder 19.

In order to limit rotation of the prop, as aforesaid, and to yieldably retain it in either of such positions, the end of the housing engaged by the projecting ends of pin 22 is formed with two pairs of diametrically opposed recesses 24 and 25, pair 24 being engaged by the ends of pin 22 when the prop 8 is in an inoperative position and pair 25 being engaged by the ends of pin 22 when the prop is in an operative position. To limit movement of the prop 8 beyond these positions, the actuate lands 26 between the recesses are provided with walls 27 which are normal to the plane traversed by the ends of pin 22 during rotation of the prop. On the other hand, in order to yieldably hold the prop in either of such positions, one of the walls of each of the recesses 24 and 25 is inclined relative to the plane traversed by the ends of pin 22, whereby the axial force exerted by spring 23 is translated by these inclined walls into a force tending to relatively rotate the prop and housing and thus yieldably urge the ends of pin 22 into engagement in either pair of recesses and into engagement with the normal walls 27 thereof. The lands 28 between adjacent recesses 24 and 25 are preferably offset longitudinally of the lands 26 to facilitate movement of prop 8 once the ends of pin 22 have climbed out of the recesses 24 and 25 and so that the pin ends do not excessively extend longitudinally beyond the lands 26 during swinging of the prop.

It is to be noted that the recesses 24 and 25 are spaced apart more than 90° whereby when the prop is swung from the dotted to the solid line position in Fig. 1, it will be slightly inclined from vertical so that the weight supported thereby will result in a force component eccentric of the pivot axis of the prop which tends to rotate the prop clockwise as viewed in Fig. 1 and to urge the ends of pin 22 into firmer engagement with the stop walls 27.

Other modes of applying the principle of the invention may be employed, change being made as regards the details described, provided the features stated in any of the following claims or the equivalent of such be employed.

I, therefore, particularly point out and distinctly claim as my invention:

1. A bicycle kick stand for attachment to a bicycle frame, comprising an elongated hollow housing, a prop journalled therein, and means for the adjustment of said housing and prop transversely with respect to the plane of the bicycle frame including a bracket slidably mounted on said housing and a clamp associated with said bracket for drawing said housing into engagement with a bicycle frame with said housing adjusted to a predetermined longitudinal position relative to said bracket.

2. A bicycle kick stand comprising an elongated hollow housing of non-cylindrical exterior cross section, a prop journalled within said housing, and a U-shaped bracket fitted over said housing formed with coaxial openings in the spaced leg portions thereof of cross section complementary to that of the exterior of said housing.

3. A bicycle kick stand comprising an elongated hollow housing of non-cylindrical exterior cross section, a prop journalled within said housing, and a U-shaped bracket fitted over said housing formed with coaxial openings in the spaced leg portions thereof of cross section complementary to that of the exterior of said housing, the axis of such openings being inclined relative to the planes in which such leg portions lie.

4. In a bicycle kick stand of the type comprising a housing clamped against the bottom sides of two spaced apart bicycle frame members which form the lower rear fork thereof and a prop rotatable in said housing to and from a bicycle supporting position, the combination of a housing of non-cylindrical cross-section and of length exceeding the width of the space between said members, a U-shaped bracket non-rotatably fitted in such space and formed with coaxial openings in the leg portions thereof of cross-section complementary to that of said housing, said housing being fitted into the openings in said bracket and adjustable longitudinally thereof, and a clamp associated with said bracket and spanning the top sides of said members for drawing said housing into engagement with the bottom sides of said members.

HOMER L. MUELLER.

REFERENCES CITED

The following references are of record in the file of this patent:

UNITED STATES PATENTS

| Number | Name | Date |
| --- | --- | --- |
| 836,303 | Christensen | Nov. 20, 1906 |
| 2,049,218 | Miller | July 28, 1936 |
| 2,395,148 | Schwinn | Feb. 19, 1946 |

FOREIGN PATENTS

| Number | Country | Date |
| --- | --- | --- |
| 343,573 | Italy | Oct. 3, 1936 |
| 562,021 | France | Aug. 23, 1923 |